Sept. 4, 1923.           C. W. HUME           1,467,039
                    SLUICE OR GATE VALVE
              Filed Dec. 12, 1922          2 Sheets-Sheet 1

Sept. 4, 1923.

C. W. HUME 1,467,039

SLUICE OR GATE VALVE

Filed Dec. 12, 1922     2 Sheets-Sheet 2

Patented Sept. 4, 1923.

1,467,039

UNITED STATES PATENT OFFICE.

CRAWFORD WILLIAM HUME, OF GLASGOW, SCOTLAND, ASSIGNOR TO JAMES HOWDEN & COMPANY, LIMITED, OF GLASGOW, SCOTLAND, A CORPORATION OF THE UNITED KINGDOM OF GREAT BRITAIN AND IRELAND.

SLUICE OR GATE VALVE.

Application filed December 12, 1922. Serial No. 606,441.

*To all whom it may concern:*

Be it known that I, CRAWFORD WILLIAM HUME, a subject of the King of the United Kingdom of Great Britain and Ireland, and residing at Glasgow, Scotland, have invented a certain new and useful Improvement in Sluice or Gate Valves, of which the following is a specification.

This invention relates to sluice or gate valves the closure of which is effected by means of a spring acting automatically on the withdrawal of a detaining device actuated from a remote station.

The present invention consists in an improved construction in which the spindle is provided with a sunk thread engageable by a divided nut mounted on the hand-wheel which serves for normal operation of the valve, the nut sections being normally held in engagement with the spindle by means of springs, and being disengageable from the spindle by manual operation from a station remote from the valve.

In practice the nut sections are operatively connected to bell-crank levers fulcrumed, for example, on a cap which houses the upper end of the spindle, one end of each lever engaging a socket in the corresponding nut section and the other end of each lever being operatively connected to one arm of a spider structure terminating beyond the upper end of the spindle and movable axially of the spindle, said structure being fitted with an eye-bolt to which is secured the end of an emergency operating cord or the like.

Figure 1:
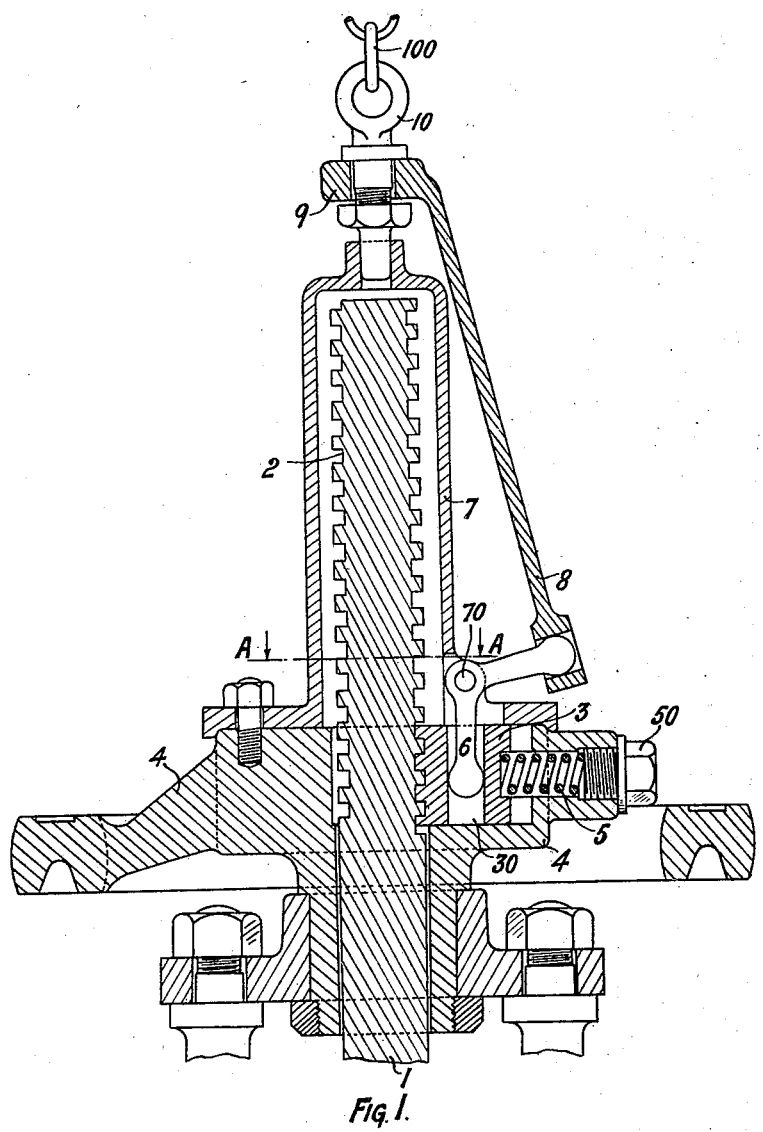
Figure 2:
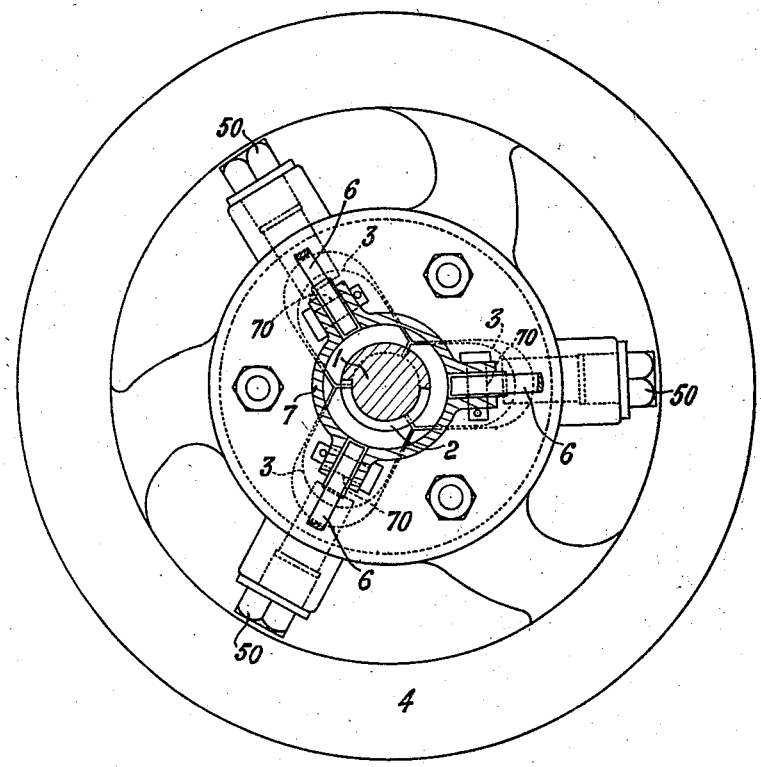

The invention is illustrated in the accompanying drawing in which Fig. 1 is a vertical section and Fig. 2 is a section on the line A—A of Fig. 1.

The construction shown includes a valve spindle 1 provided with a sunk thread at 2 engaged by a divided nut 3 mounted on the hand-wheel 4 which serves for normal operation of the valve, the nut sections being normally held in engagement with the spindle by means of radially disposed compression springs 5 each interposed between the relative nut section and an adjustable plug 50.

The divided nut comprises three sections each of which is operated by a bell-crank lever 6 fulcrumed at 70 on a cap 7 which houses the upper end of the spindle 1. One end of each bell-crank lever 6 engages a socket 30 in a corresponding section of the nut and the other end of each bell-crank lever 6 is operatively connected to one arm 8 of a spider frame 9 terminating beyond the upper end of the spindle 1 and movable in the axial direction of the latter, said frame being fitted with an eye-bolt 10 to which is secured the end of an emergency operating cord 100 or the like.

In operation, the valve is moved into open position in opposition to the usual main spring (not shown) by means of the hand-wheel 4. When the valve is to be closed, in case of emergency, the operating cord 100 is pulled, whereby the spider frame 9 is moved in the axial direction of the spindle so as to rock the bell-crank levers 6 and cause the nut sections 3 to be moved substantially radially out of engagement with the spindle 1, in consequence of which the valve is permitted to close under the action of the main spring.

What I claim is:—

In a sluice or gate valve, in combination, a spindle provided with a screw-thread, a divided nut comprising sections engageable with and disengageable from the spindle, means normally urging said sections into engagement with the spindle, a housing for one end of the spindle, bell-crank levers mounted on said housing, each lever operatively connected to a nut section, and a structure connected to said levers, and movable axially of the spindle to effect movement of said levers whereby to disengage the nut sections from the spindle.

In testimony whereof I have signed my name to this specification in the presence of two subscribing witnesses.

CRAWFORD WILLIAM HUME.

Witnesses:
ISABEL ROLLO,
JEAN McPHERSON.